(12) United States Patent
Ohtake et al.

(10) Patent No.: US 11,545,112 B2
(45) Date of Patent: Jan. 3, 2023

(54) DISPLAY CONTROL DEVICE, DISPLAY CONTROL METHOD, AND STORAGE MEDIUM STORING PROGRAM

(71) Applicants: TOYOTA JIDOSHA KABUSHIKI KAISHA, Toyota (JP); DENSO TEN Limited, Kobe (JP)

(72) Inventors: Kazuya Ohtake, Toyota (JP); Rio Mizuno, Aichi-gun (JP); Kazuki Sasamoto, Chita-gun (JP); Hiroshi Majima, Kobe (JP)

(73) Assignees: TOYOTA JIDOSHA KABUSHIKI KAISHA, Toyota (JP); DENSO TEN Limited, Kobe (JP)

( * ) Notice: Subject to any disclaimer, the term of this patent is extended or adjusted under 35 U.S.C. 154(b) by 0 days.

(21) Appl. No.: 17/221,206

(22) Filed: Apr. 2, 2021

(65) Prior Publication Data
US 2021/0327396 A1 Oct. 21, 2021

(30) Foreign Application Priority Data

Apr. 17, 2020 (JP) .............................. JP2020-074354

(51) Int. Cl.
*G09G 5/14* (2006.01)
*G06T 13/80* (2011.01)
(Continued)

(52) U.S. Cl.
CPC ............... *G09G 5/14* (2013.01); *B60K 35/00* (2013.01); *G02B 27/0101* (2013.01);
(Continued)

(58) Field of Classification Search
CPC .. G09G 5/14; G09G 2354/00; G09G 2380/10; B60K 35/00; B60K 2370/1529; B60K 2370/1534; B60K 2370/165; B60K 2370/18; B60K 2370/152; B60K 2370/1523; B60K 2370/164;
(Continued)

(56) References Cited

U.S. PATENT DOCUMENTS 11,180,159 B1\* 11/2021 Post ...................... B60W 50/14
2007/0192020 A1\* 8/2007 Brulle-Drews .... G01C 21/3647
701/532
(Continued)

FOREIGN PATENT DOCUMENTS

JP 2017-087980 A 5/2017
JP 2018-013812 A 1/2018

*Primary Examiner* — Tapas Mazumder
(74) *Attorney, Agent, or Firm* — Oliff PLC

(57) ABSTRACT

A display control device provided at a vehicle and including a processor, a first display section, a second display section adjacent to the first display section, and a third display section adjacent to the second display section in a different direction from the first display section. The processor being configured to: control the first display section, the second display section, and the third display section; acquire notification information to be notified to a driver of the vehicle; and execute an animation such that the notification information currently being displayed on one of the first display section or the third display section is displayed on the second display section and then displayed on another of the first display section or the third display section.

10 Claims, 13 Drawing Sheets

(51) Int. Cl.
*B60K 35/00* (2006.01)
*G02B 27/01* (2006.01)
(52) U.S. Cl.
CPC ...... *G06T 13/80* (2013.01); *B60K 2370/1529* (2019.05); *B60K 2370/1534* (2019.05); *B60K 2370/165* (2019.05); *B60K 2370/18* (2019.05); *G02B 2027/014* (2013.01); *G02B 2027/0141* (2013.01); *G09G 2354/00* (2013.01); *G09G 2380/10* (2013.01)
(58) Field of Classification Search
CPC ........ B60K 2370/166; B60K 2370/182; G02B 27/0101; G02B 2027/014; G02B 2027/0141; G06T 13/80; G06F 3/0485
See application file for complete search history.

(56) References Cited

U.S. PATENT DOCUMENTS

| | | | |
|---|---|---|---|
| 2013/0127876 A1* | 5/2013 | Sitarski | G09G 3/004 |
| | | | 345/473 |
| 2014/0129092 A1* | 5/2014 | Mori | B60K 37/00 |
| | | | 701/49 |
| 2017/0129401 A1 | 5/2017 | Matsuoka et al. | |
| 2017/0253122 A1* | 9/2017 | Jun | G01C 21/365 |
| 2018/0091085 A1 | 3/2018 | Tamagaki et al. | |
| 2018/0345988 A1 | 12/2018 | Mimura et al. | |

* cited by examiner

FIG.3

| NOTIFICATION INFORMATION | GENERATION INFORMATION ||||
| --- | --- | --- | --- | --- |
| | DISPLAY START POSITION (X,Y) | DISPLAY END POSITION (X,Y) | ANIMATION PATTERN | DISPLAY DURATION |
| ROUTE GUIDANCE NOTIFICATION | CENTER DISPLAY (300, 80) | HEAD-UP DISPLAY (700, 165) | PATTERN A | 5 SECONDS |
| AUDIO OPERATION FEEDBACK NOTIFICATION | HEAD-UP DISPLAY (700, 170) | CENTER DISPLAY (400, 50) | PATTERN B | 5 SECONDS |

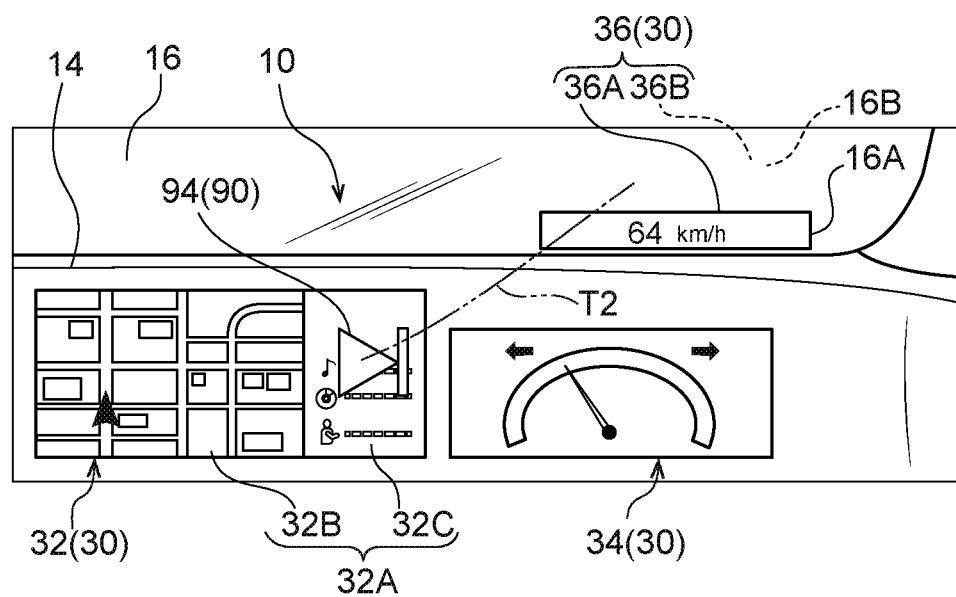

DISPLAY CONTROL DEVICE, DISPLAY CONTROL METHOD, AND STORAGE MEDIUM STORING PROGRAM

CROSS-REFERENCE TO RELATED APPLICATION

This application is based on and claims priority under 35 USC 119 from Japanese Patent Application No. 2020-074354 filed on Apr. 17, 2020, the disclosure of which is incorporated by reference herein.

BACKGROUND

Technical Field

The present disclosure relates to a display control device, a display control method, and a storage medium for controlling an image for display on a display device.

Related Art

Japanese Patent Application Laid-Open (JP-A) No. 2017-087980 discloses a drive support device that utilizes a limited display space provided inside a vehicle to enable drive support information to be effectively provided to a driver.

In cases in which the drive support information is priority drive support information, the drive support device displays the drive support information on a head-up display, and in cases in which the drive support information is non-priority drive support information, the drive support device displays the drive support information on a meter display.

In this drive support device, there is room for improvement since the driver may not always notice the display when the display location changes in accordance with the level of the information.

SUMMARY

An object of the present disclosure is to provide a display control device, a display control method, and a storage medium capable of causing display to transition between plural display sections in a manner that enables a driver to be made aware of the display.

A first aspect is a display control device provided at a vehicle and including a first display section, a second display section adjacent to the first display section, and a third display section adjacent to the second display section in a different direction from the first display section. The display control device is configured to control the first display section, the second display section, and the third display section and includes an acquisition section and an execution section. The acquisition section is configured to acquire notification information to be notified to a driver of the vehicle. The execution section is configured to execute an animation such that the notification information currently being displayed on one of the first display section or the third display section is displayed on the second display section and then displayed on another of the first display section or the third display section.

The display control device of the first aspect is applied to the vehicle that includes the plural mutually adjacent display sections. In this display control device, the acquisition section acquires the notification information, and the execution section displays the notification information as an animation on the first display section, the second display section, and the third display section in sequence, or on the third display section, the second display section, and the first display section in sequence. In this display control device, causing the display to transition between the plural display sections enables the driver to be made aware of the display relating to the notification information.

A display control device of a second aspect is the display control device of the first aspect, wherein the first display section, the second display section, and the third display section are disposed in this sequence from outside of a field of vision of the driver when driving toward a center of the field of vision. The execution section is configured such that, when the notification information currently being displayed on the first display section relates to travel of the vehicle at a predetermined stimulus, the execution section executes an animation to move display of the notification information from the first display section to the third display section via the second display section.

In the display control device of the second aspect, the execution section moves the display of the notification information relating to travel of the vehicle from outside the field of vision of the driver toward the center of the field of vision. Accordingly, this display control device enables the display relating to travel to be brought to the attention of the driver, while ultimately content of the notification information relating to travel of the vehicle is fully registered by the driver.

A display control device of a third aspect is the display control device of either the first aspect or the second aspect, wherein the first display section, the second display section, and the third display section are disposed in this sequence from outside of a field of vision of the driver when driving toward a center of the field of vision. The execution section is configured such that, when the notification information currently being displayed on the third display section relates to functional operation of the vehicle accompanying operation by the driver, the execution section executes an animation to move display of the notification information from the third display section to the first display section via the second display section.

In the display control device of the third aspect, the execution section moves the display of the notification information relating to functional operation of the vehicle from the center of the field of vision of the driver toward the outside of the field of vision. Accordingly, this display control device enables the display relating to functional operation to be brought to the attention of the driver, while ultimately not getting in the way of driving.

A display control device of a fourth aspect is the display control device of any one of the first aspect to the third aspect, wherein the first display section is a center display installed at a vehicle width direction center of the vehicle, the second display section is a lower display section corresponding to a display region toward a vehicle lower side of a head-up display installed at a vehicle upper side of a meter display, and the third display section is an upper display section corresponding to a display region at the vehicle upper side of the lower display section of the head-up display. The execution section is configured to execute an animation to move the notification information along a line spanning the center display, the lower display section, and the upper display section.

In the display control device of the fourth aspect, causing the display to transition between the two display sections, namely the center display and the head-up display, enables the driver to be made aware of the display relating to the notification information.

A display control device of a fifth aspect is the display control device of any one of the first aspect to the third aspect, wherein the first display section is a center display installed at a vehicle width direction center of the vehicle, the second display section is a meter display installed facing the driver, and the third display section is a head-up display installed at a vehicle upper side of the meter display. The execution section is configured to execute an animation to move the notification information along a line spanning the center display, the meter display, and the head-up display.

In the display control device of the fifth aspect, causing the display to transition between the center display, the meter display, and the head-up display enables the driver to be made aware of the display relating to the notification information.

A sixth aspect is a display control method for controlling a first display section, a second display section, and a third display section that are provided at a vehicle such that the second display section is provided adjacent to the first display section, and the third display section is provided adjacent to the second display section in a different direction from the first display section. The display control method includes acquisition processing to acquire notification information to be notified to a driver of the vehicle, and execution processing to execute an animation such that the notification information currently being displayed on one of the first display section or the third display section is displayed on the second display section and then displayed on another of the first display section or the third display section.

The display control method of the sixth aspect is applied to the vehicle that includes the plural mutually adjacent display sections. In this display control method, the notification information is acquired during the acquisition processing, and the notification information is displayed as an animation during the execution processing on the first display section, the second display section, and the third display section in sequence, or on the third display section, the second display section, and the first display section in sequence. In this display control method, causing the display to transition between the plural display sections enables the driver to be made aware of the display relating to the notification information.

A seventh aspect is a non-transitory storage medium storing a program. The program is configured to control a first display section, a second display section, and a third display section provided at a vehicle such that the second display section is provided adjacent to the first display section, and the third display section is provided adjacent to the second display section in a different direction from the first display section. The program is executable by a computer to perform processing including acquisition processing to acquire notification information to be notified to a driver of the vehicle, and execution processing to execute an animation such that the notification information currently being displayed on one of the first display section or the third display section is displayed on the second display section and then displayed on another of the first display section or the third display section.

The program recorded with the non-transitory storage medium of the seventh aspect causes the computer to execute the following processing in the vehicle that includes the plural mutually adjacent display sections. Namely, in the computer, the notification information is acquired during the acquisition processing, and the notification information is displayed as an animation during the execution processing on the first display section, the second display section, and the third display section in sequence, or on the third display section, the second display section, and the first display section in sequence. In the storage medium storing this program, causing the display to transition between the plural display sections enables the driver to be made aware of the display relating to the notification information.

The present disclosure causes the display to transition between the plural display sections, enabling the driver to be made aware of the display.

BRIEF DESCRIPTION OF THE DRAWINGS

Exemplary embodiments of the present disclosure will be described in detail based on the following figures, wherein:

FIG. 3 is a diagram to explain content of a management table in the first exemplary embodiment;

FIG. 6C illustrates an example of feedback notification by display devices of the first exemplary embodiment at the end of an animation;

DETAILED DESCRIPTION

First Exemplary Embodiment

Explanation follows regarding a display system 10 including a display control device 20 of a first exemplary embodiment, with reference to the drawings. Note that in FIG. 1, FIG. 5A to FIG. 5C, FIG. 6A to FIG. 6C, FIG. 8A to FIG. 8C, and FIG. 9A to FIG. 9C, reference to upward, downward, left, and right directions in the context of display of respective display devices 30 refers to these directions as seen from the perspective of a driver looking at the respective display devices 30.

Basic Configuration

Figure 1:
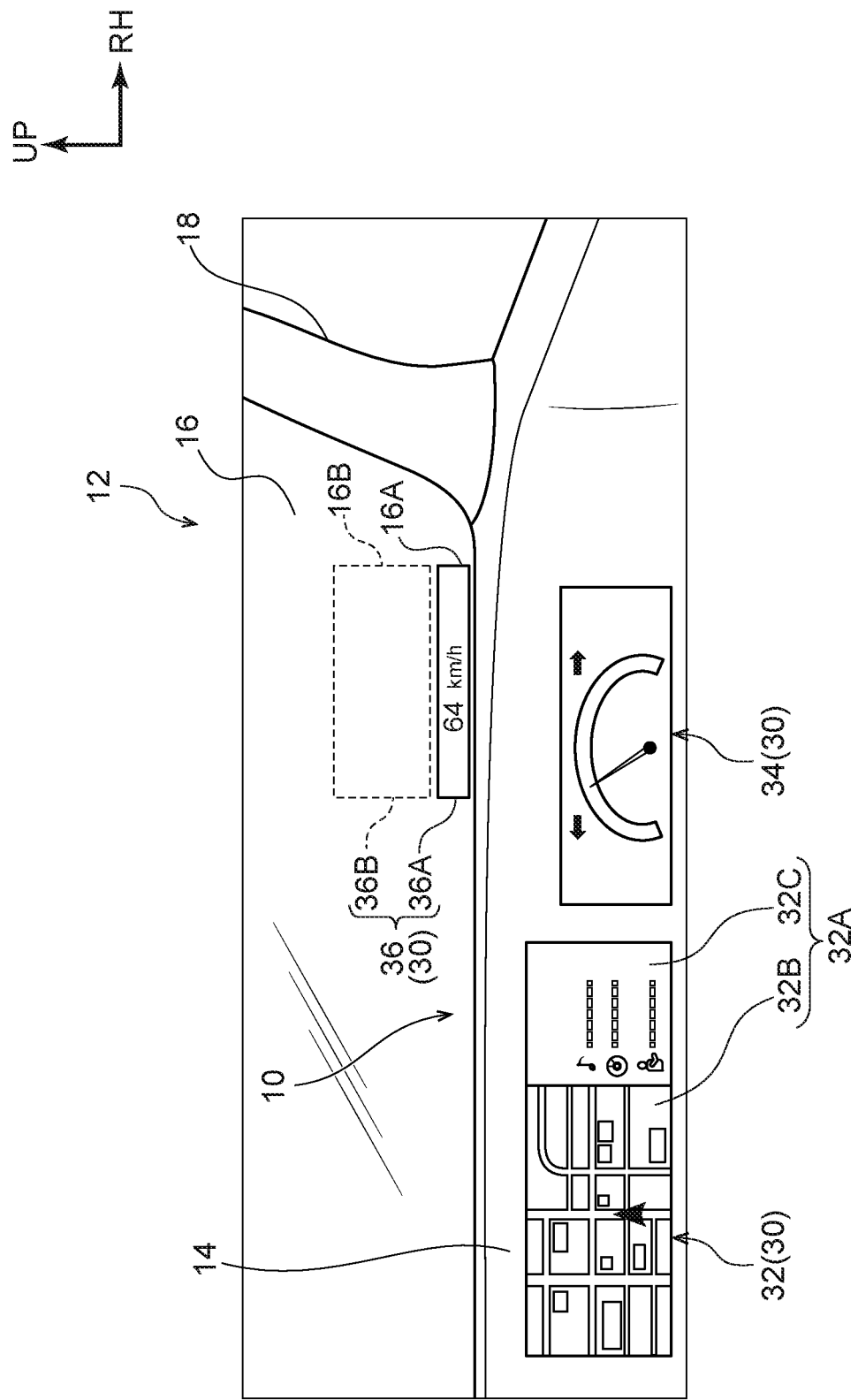
FIG. 1 is an external view of a display system provided at a vehicle according to a first exemplary embodiment.
Figure 2:
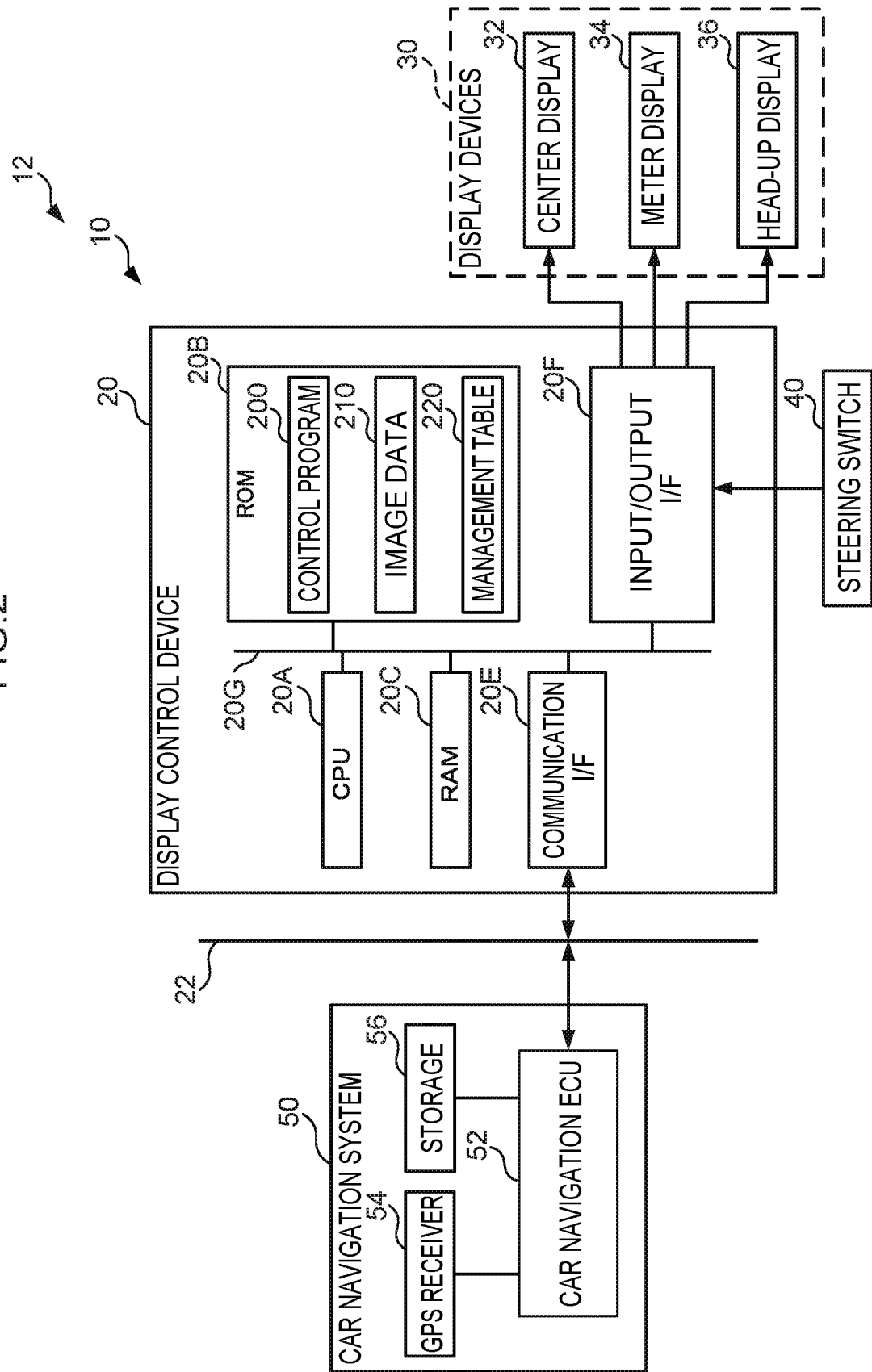
FIG. 2 is a block diagram illustrating hardware configuration of a display system of the first exemplary embodiment.

As illustrated in FIG. 1 and FIG. 2, the display system 10 of the present exemplary embodiment is installed in a vehicle 12. The display system 10 is configured including the display control device 20, the display devices 30, and a car navigation system 50.

The display control device 20 and a car navigation electronic control unit (ECU) 52 of the car navigation system 50 are connected together through an external bus 22.

Display Devices

The display devices 30 are configured including a center display 32, a meter display 34, and a head-up display 36. The display devices 30 are capable of displaying a route ahead display 80 or an operation display 90, as described later.

As illustrated in FIG. 1, the center display 32 is a liquid crystal display provided at a vehicle width direction center of a dashboard 14. The center display 32 includes an overall screen display region 32A, of which approximately the left two thirds is an information region 32B and approximately the right one third is a notification region 32C. The information region 32B displays images relating to the car navigation system 50, for example a map image indicating a current position of the vehicle 12, or an image guiding the vehicle 12 toward a destination. The notification region 32C displays images relating to an audio function of the car navigation system 50, for example. In the present exemplary embodiment, the center display 32 is an example of a first display section.

The meter display 34 is a liquid crystal display provided to the dashboard 14 in front of a driver sitting in a seat, so as to be on the vehicle width direction right side of the adjacent center display 32. The meter display 34 displays information relating to travel of the vehicle 12, including the vehicle speed, engine revolution speed, and travel distance, as well as information relating to states of the vehicle 12, including warning lamps and light operation status.

The head-up display 36 is adjacent on the vehicle upper side of the meter display 34, and is a projection device including a projection screen 16A and a projection screen 16B on a front windshield 16. The projection screen 16A configures a lower projection area 36A serving as a lower display section, and the projection screen 16B configures an upper projection area 36B serving as an upper display section. The lower projection area 36A and the upper projection area 36B are adjacent to each other in the vehicle vertical direction. From among information to inform the driver of the vehicle speed, a direction of progress of the vehicle 12, an operation position of a steering switch 40, described later, and the like, information with a high priority level is displayed on the head-up display 36. In the present exemplary embodiment, the lower projection area 36A is an example of a second display section, and the upper projection area 36B is an example of a third display section.

Car Navigation System

As illustrated in FIG. 2, in addition to the car navigation ECU 52, the car navigation system 50 is configured including a GPS receiver 54 and storage 56. The car navigation system 50 of the present exemplary embodiment includes both a car navigation function and an audio function, as a minimum.

The GPS receiver 54 measures the current position of the vehicle 12 by receiving GPS signals from plural GPS satellites.

The storage 56 is configured by a hard disk drive (HDD) or a solid state drive (SSD), and stores map data and music data.

The car navigation ECU 52 includes functionality to generate a travel route to the destination of the vehicle 12, guide the vehicle 12 to the destination based on position information, and the like. The car navigation ECU 52 is configured including a CPU, ROM, RAM, a communication I/F, an input/output I/F, and the like.

The car navigation ECU 52 of the present exemplary embodiment sets a route to the destination based on destination information input using the center display 32 that also serves as a touch panel, the map data stored in the storage 56, and the like. The car navigation ECU 52 also displays a map indicating the current position of the vehicle 12 or a screen to guide the vehicle 12 to the destination on the center display 32, based on the position information received from the GPS receiver 54.

Display Control Device

The display control device 20 is configured including a central processing unit (CPU) 20A, read only memory (ROM) 20B, random access memory (RAM) 20C, a communication interface (I/F) 20E, and an input/output interface (I/F) 20F. The CPU 20A, the ROM 20B, the RAM 20C, the communication I/F 20E, and the input/output I/F 20F are connected together so as to be capable of communicating with each other through an internal bus 20G.

The CPU 20A is a central processing unit that executes various programs and controls various sections. Namely, the CPU 20A reads programs from the ROM 20B and executes such programs using the RAM 20C as a workspace. The CPU 20A is an example of a processor.

The ROM 20B stores various programs and various data. The ROM 20B of the present exemplary embodiment is stored with a control program 200, image data 210, and a management table 220. The control program 200 is a program for performing image display processing, described later. The image data 210 is stored data of images of icons and the like for display on the respective display devices 30.

The management table 220 sets out display rules for animations for display on the respective display devices 30. As illustrated in FIG. 3, the management table 220 sets out notification information to be notified to the driver, as well as generation information required in order to generate animations. The generation information includes at least animation display start positions, animation display end positions, animation patterns, and animation display durations.

The notification information is information to be notified to the driver of the vehicle 12. For example, the notification information includes information relating to travel of the vehicle 12, and information relating to functional operation of the vehicle 12. The information relating to travel of the vehicle 12 includes "route guidance notification". For example, notification using arrows or the like when providing route guidance on the car navigation system 50 corresponds to the route guidance notification. The information relating to functional operation of the vehicle 12 includes "audio operation feedback notification" (referred to hereafter simply as "feedback notification"). For example, in cases in which the steering switch 40 is used to perform an audio playback operation or the like, notification enabling an operation position to be ascertained without looking at the steering switch 40 corresponds to the feedback notification.

The display start positions and display end positions are defined by X, Y coordinates on a screen. The X, Y coordinates are coordinates in a common coordinate system spanning the center display 32, the meter display 34, and the head-up display 36, and for example have their origin at the vehicle lower side of the vehicle width direction center.

The animation patterns set out trajectories of images relating to notification information to be transitioned. The display durations set out the length of time from the start to the end of the animations.

The RAM 20C serves as a workspace that temporarily stores programs or data.

The communication I/F 20E is an interface for connecting to the car navigation ECU 52 and other ECUs. A controller area network (CAN) communication protocol is employed for this interface. The communication I/F 20E is connected to the external bus 22. Note that the communication method of the communication I/F 20E is not limited to CAN, and a LAN protocol such as Ethernet (registered trademark) may be adopted therefor.

The input/output I/F 20F is an interface for communicating with the respective display devices 30 including the center display 32, the meter display 34, and the head-up display 36, and the steering switch 40 provided to a steering wheel. The steering switch 40 is provided at a position on a spoke of the steering wheel that the driver can operate using their thumb.

Figure 4:
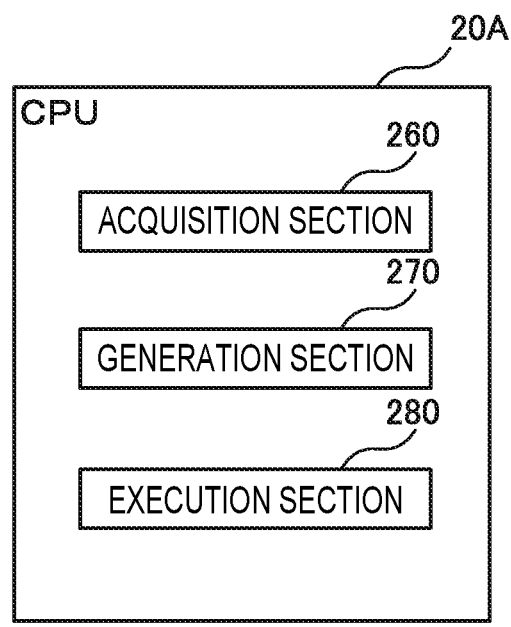
FIG. 4 is a block diagram illustrating an example of functional configuration of a CPU of a display control device of the first exemplary embodiment.

FIG. 4 is a block diagram illustrating an example of functional configuration of the display control device 20. The respective functional configuration is implemented by the CPU 20A reading and executing the control program 200 stored in the ROM 20B. The CPU 20A of the present exemplary embodiment executes the control program 200 so as to function as an acquisition section 260, a generation section 270, and an execution section 280.

The acquisition section 260 includes functionality to acquire notification information to be notified to the driver of the vehicle 12. The acquisition section 260 of the present exemplary embodiment acquires information regarding the direction of progress and the like as notification information from the car navigation system 50 when the car navigation system 50 performs route guidance notification. The acquisition section 260 also acquires information regarding an operation mode of the steering switch 40 as notification information in cases in which the car navigation system 50 has received audio operation such as music data playback through the steering switch 40.

The generation section 270 includes functionality to generate an animation for display on the respective display devices 30. Specifically, the generation section 270 references the management table 220, and acquires generation information corresponding to the notification information acquired by the acquisition section 260. The generation section 270 generates an animation based on the generation information and the images stored in the image data 210.

Figure 5A:
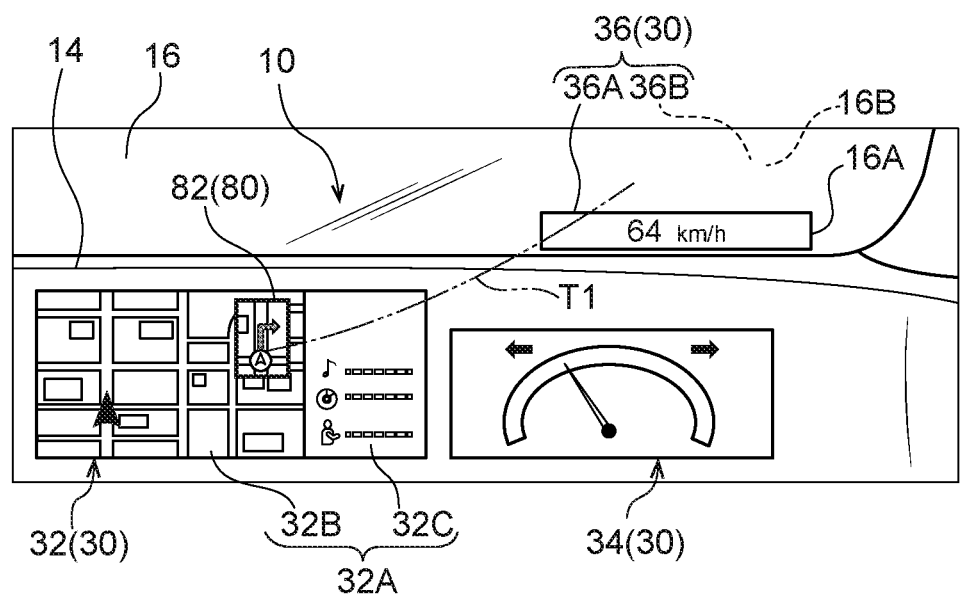
FIG. 5A illustrates an example of route guidance notification by display devices of the first exemplary embodiment at the start of an animation.
Figure 5B:
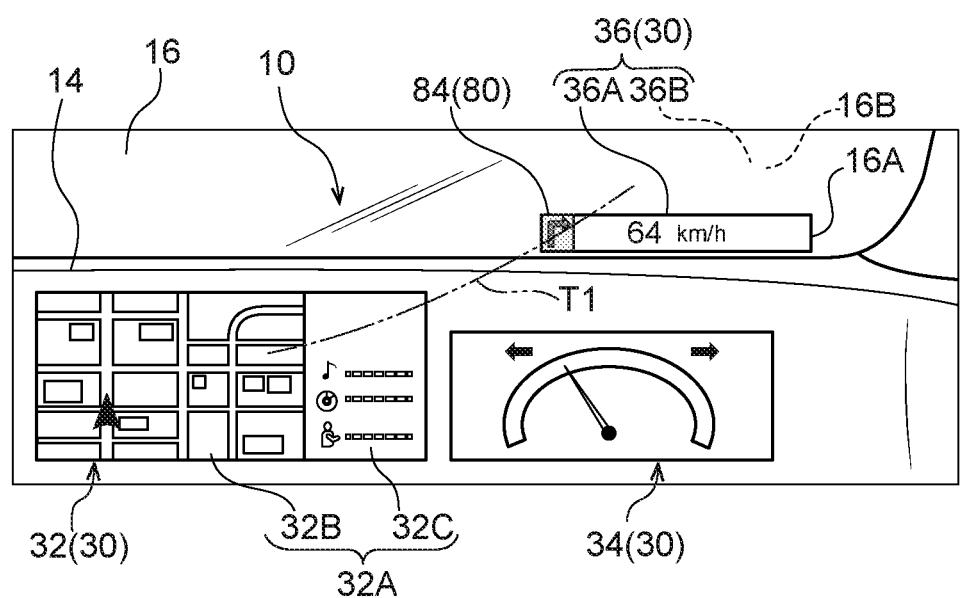
FIG. 5B illustrates an example of route guidance notification by display devices of the first exemplary embodiment during execution of an animation.
Figure 5C:
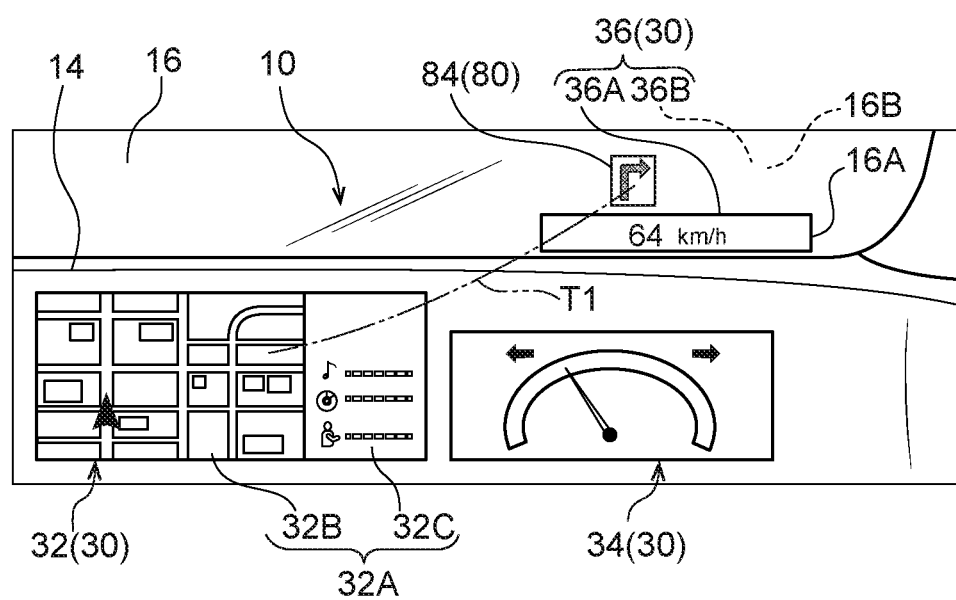
FIG. 5C illustrates an example of route guidance notification by display devices of the first exemplary embodiment at the end of an animation.

For example, as illustrated in FIG. 5A to FIG. 5C, in the case of route guidance notification, an animation is generated to transition a route ahead display 80 displayed in the information region 32B of the center display 32 along a trajectory T1 through the lower projection area 36A to reach the upper projection area 36B. The trajectory T1 corresponds to a "line spanning the center display, the lower display section, and the upper display section".

FIG. 5A to FIG. 5C illustrate a situation in which an instruction for the vehicle 12 to turn right is received during route guidance, in which an image graphically representing a right-pointing arrow or the like configures the route ahead display 80. In this case, the route ahead display 80 displayed on the information region 32B of the center display 32 is a detailed display 82 (see FIG. 5A) graphically representing the shape of a crossroad and an arrow. The route ahead display 80 displayed on the head-up display 36 (namely the lower projection area 36A and the upper projection area 36B) is configured by a simplified display 84 in which the detailed display 82 has been simplified so as to graphically represent an arrow only (see FIG. 5B and FIG. 5C). Accordingly, in the animation generated by the generation section 270, the detailed display 82 transforms into the simplified display 84 in the process of transitioning from the center display 32 to the head-up display 36.

Figure 6A:
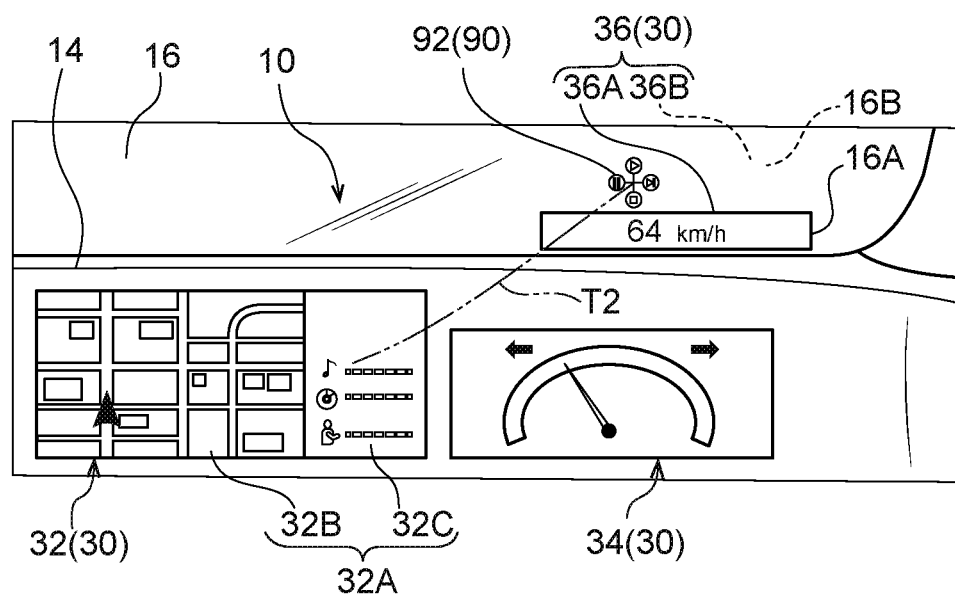
FIG. 6A illustrates an example of feedback notification by display devices of the first exemplary embodiment at the start of an animation.
Figure 6B:
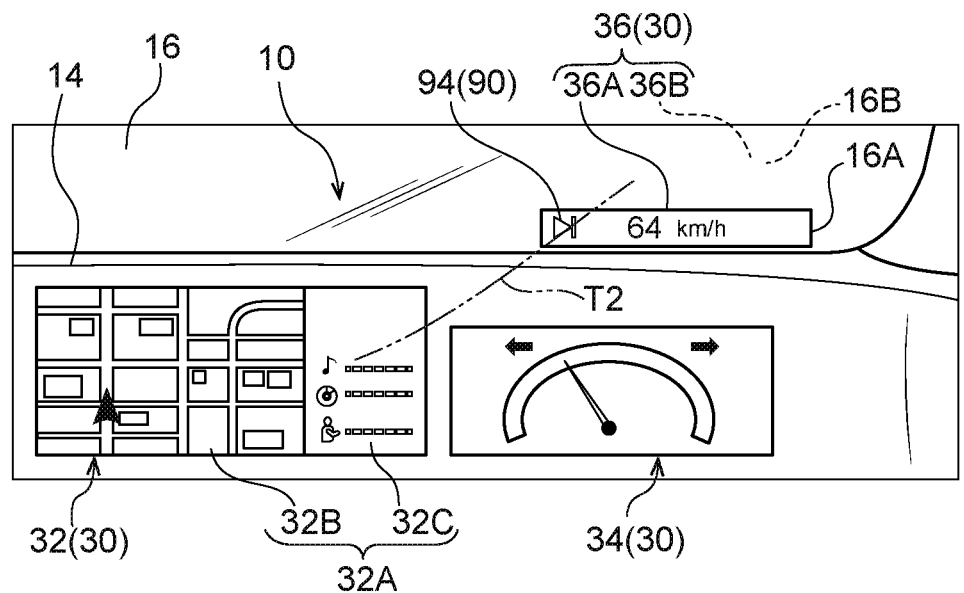
FIG. 6B illustrates an example of feedback notification by display devices of the first exemplary embodiment during execution of an animation.

As another example, as illustrated in FIG. 6A to FIG. 6C, in the case of feedback notification, an animation is generated in which an operation display 90 displayed on the upper projection area 36B transitions along a trajectory T2 through the lower projection area 36A to reach the notification region 32C of the center display 32. The trajectory T2 corresponds to a "line spanning the center display, the lower display section, and the upper display section".

FIG. 6A to FIG. 6C illustrate a situation in which the steering switch 40 is operated to skip forward a song on the audio, and an image graphically representing the content of the steering switch 40 configures the operation display 90. In this case, the operation display 90 displayed on the upper projection area 36B is a full display 92 (see FIG. 6A) graphically representing all operable items of the steering switch 40. The operation display 90 displayed on the lower projection area 36A and in the notification region 32C of the center display 32 graphically represents only an operated portion of the steering switch 40, and is a partial display 94 abbreviated from the full display 92 (see FIG. 6B and FIG. 6C). Accordingly, in the animation generated by the generation section 270, the full display 92 transforms into the partial display 94 in the process of transitioning from the head-up display 36 to the center display 32.

The execution section 280 includes functionality to execute the animation generated by the generation section 270 on the respective display devices 30. Specifically, in the case of route guidance notification, the execution section 280 executes the animation generated by the generation section 270 for the route ahead display 80 currently being displayed on the center display 32 at a predetermined stimulus. In the case of feedback notification, the execution section 280 executes the animation generated by the generation section 270 for the operation display 90 currently being displayed on the upper projection area 36B accompanying operation by the driver.

Control Flow

Figure 7:
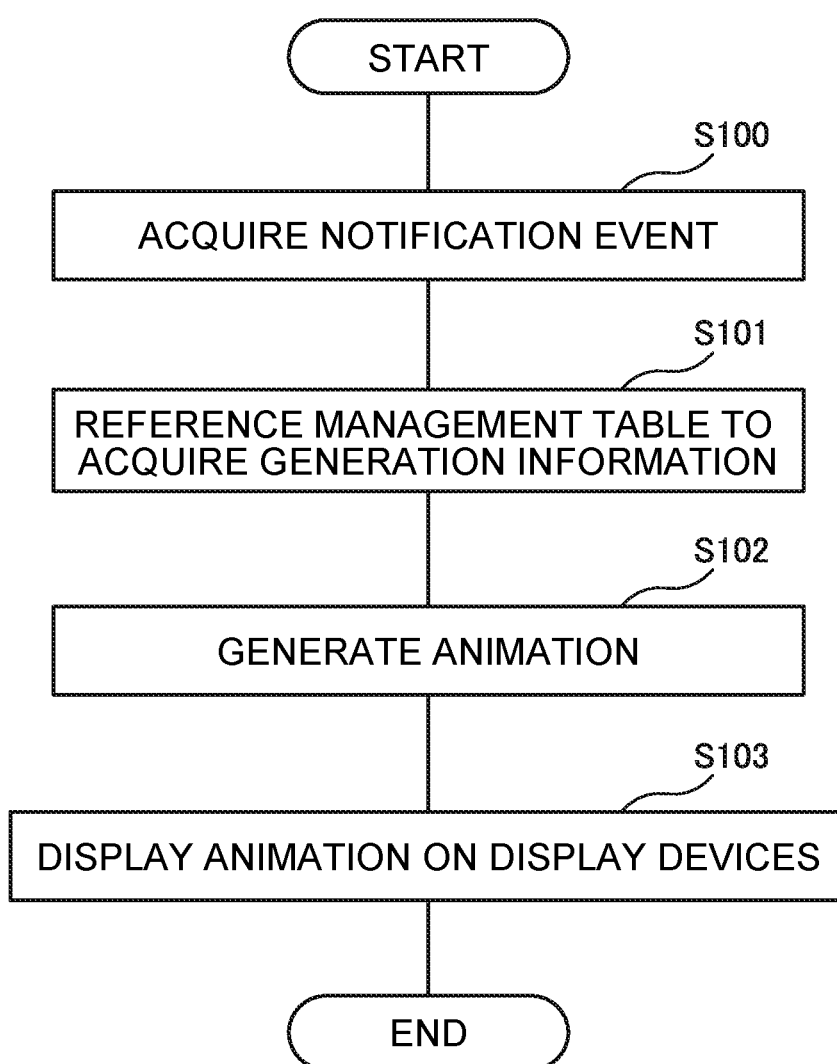
FIG. 7 is a flowchart illustrating a flow of image display processing executed by a display control device of the first exemplary embodiment.

Explanation follows regarding an example of a flow of image display processing executed on the respective display devices 30 by the display control device 20 of the present exemplary embodiment, with reference to the flowchart of FIG. 7.

At step S100 in FIG. 7, the CPU 20A acquires a notification event from the car navigation system 50. For example, in the case of the route guidance notification illustrated in FIG. 5A to FIG. 5C, when approaching a crossroads where a right turn is required in a situation in which the car navigation system 50 is performing route guidance, the car navigation system 50 creates a notification event relating to the route ahead display 80, which is acquired by the CPU 20A. As another example, in the case of the feedback notification illustrated in FIG. 6A to FIG. 6C, when the steering switch 40 is operated the CPU 20A acquires a notification event relating to the operation display 90.

At step S101, the CPU 20A references the management table 220 to acquire generation information corresponding to the acquired notification event.

At step S102, the CPU 20A generates an animation based on the generation information.

At step S103, the CPU 20A displays an animation based on the generated animation on the display devices 30. The image display processing is then ended.

Summary of First Exemplary Embodiment

The display control device 20 of the present exemplary embodiment is applied to the vehicle 12 that includes the plural mutually adjacent display devices 30. In the present exemplary embodiment, the acquisition section 260 acquires the notification information, and the execution section 280 displays the notification information as an animation on the center display 32, the lower projection area 36A, and the upper projection area 36B in sequence, or on the upper projection area 36B, the lower projection area 36A, and the center display 32 in sequence. Accordingly, in the present exemplary embodiment, causing the display to transition between the two display devices, namely the center display 32 and the head-up display 36, enables the driver to be made aware of the display relating to the notification information.

The display control device 20 of the present exemplary embodiment moves the display of notification information relating to travel of the vehicle 12 from outside the field of vision of the driver toward the center of the field of vision. Specifically, during route guidance notification relating to travel of the vehicle 12, the route ahead display 80 is displayed as an animation on the center display 32, the lower projection area 36A, and the upper projection area 36B in sequence. Accordingly, the present exemplary embodiment enables the display relating to travel to be brought to the attention of the driver, while ultimately content of the notification information relating to travel of the vehicle 12 is fully registered by the driver.

Moreover, the display control device 20 of the present exemplary embodiment moves the display of notification information relating to functional operation of the vehicle 12 from the center of the field of vision of the driver to outside the field of vision of the driver. Specifically, during feedback notification relating to functional operation of the vehicle 12, the operation display 90 is displayed as an animation on the upper projection area 36B, the lower projection area 36A, and the center display 32 in sequence. Accordingly, the present exemplary embodiment enables the display relating to functional operation to be brought to the attention of the driver, while ultimately not getting in the way of driving.

Second Exemplary Embodiment

In the first exemplary embodiment, the route ahead display 80 or the operation display 90 transitions along a line spanning the center display 32, the lower projection area 36A, and the upper projection area 36B. By contrast, in a second exemplary embodiment, configuration is made such that the route ahead display 80 or the operation display 90 transitions along a line spanning the center display 32, the meter display 34, and the head-up display 36.

In the present exemplary embodiment, the meter display 34 is an example of a second display section, and the head-up display 36 is an example of a third display section.

The head-up display 36 of the present exemplary embodiment includes only the upper projection area 36B. Note that other configuration matches that of the first exemplary embodiment, and explanation thereof is omitted.

Figure 8A:
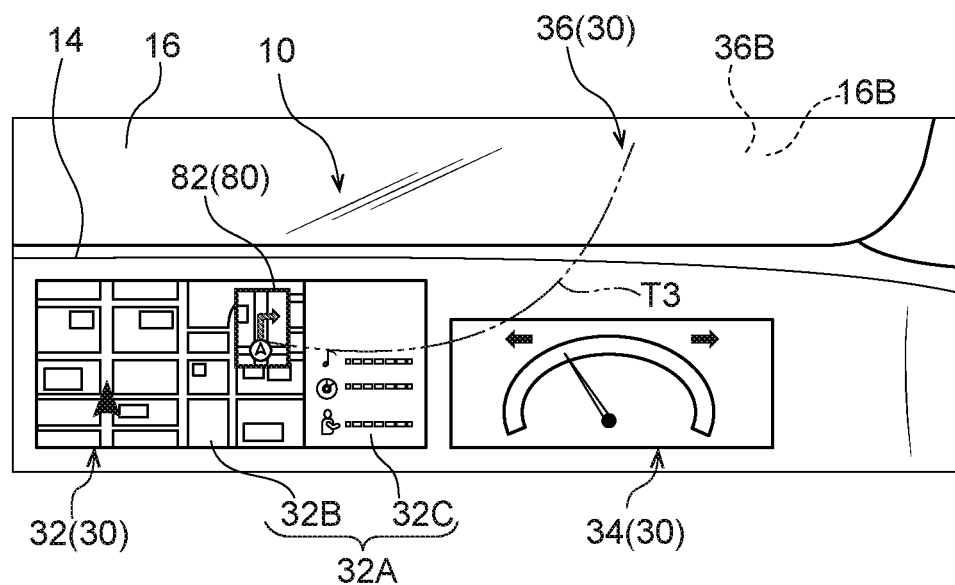
FIG. 8A illustrates an example of route guidance notification by display devices of a second exemplary embodiment at the start of an animation.
Figure 8B:
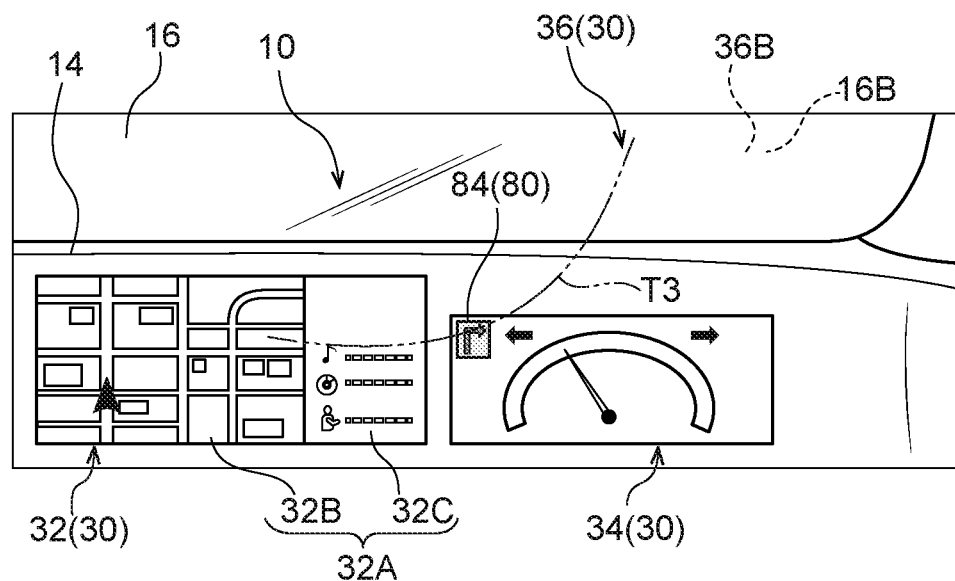
FIG. 8B illustrates an example of route guidance notification by display devices of the second exemplary embodiment during execution of an animation.
Figure 8C:
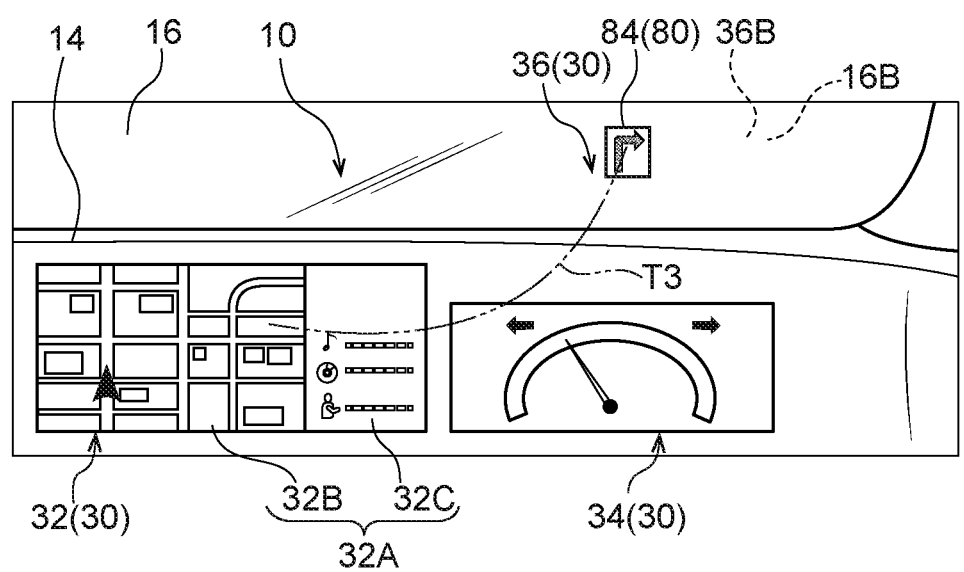
FIG. 8C illustrates an example of route guidance notification by display devices of the second exemplary embodiment at the end of an animation.

As illustrated in FIG. 8A to FIG. 8C, in the case of route guidance notification, an animation is generated to transition the route ahead display 80 displayed on the information region 32B of the center display 32 along a trajectory T3 through the meter display 34 to reach the upper projection area 36B. The trajectory T3 corresponds to a "line spanning the center display, the meter display, and the head-up display".

Figure 9A:
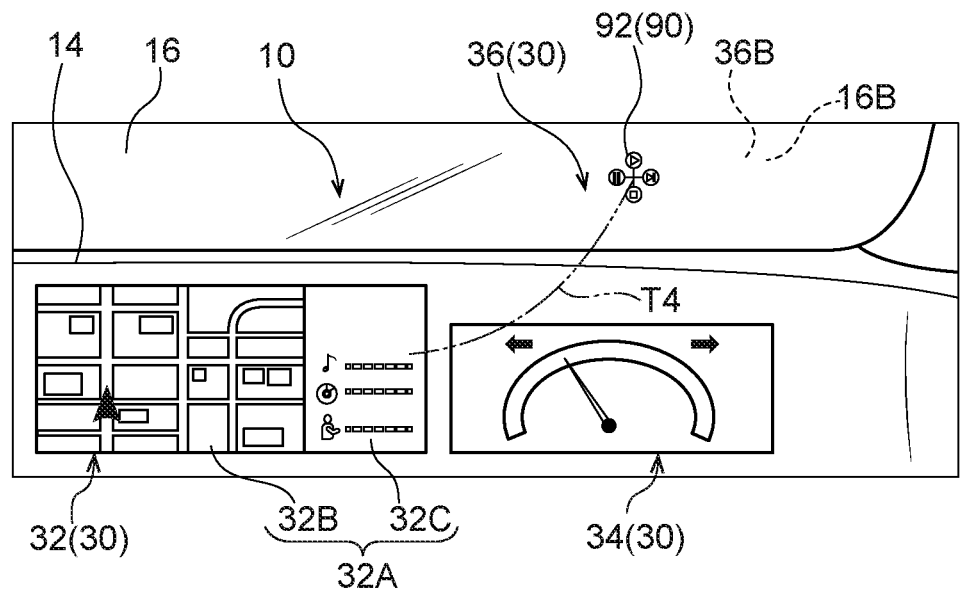
FIG. 9A illustrates an example of feedback notification by display devices of the second exemplary embodiment at the start of an animation.
Figure 9B:
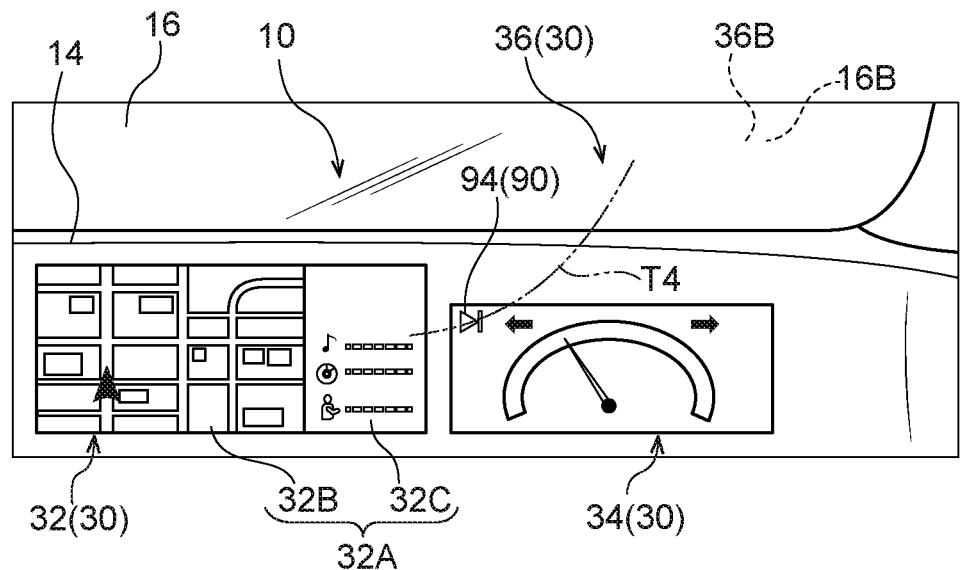
FIG. 9B illustrates an example of feedback notification by display devices of the second exemplary embodiment during execution of an animation.
Figure 9C:
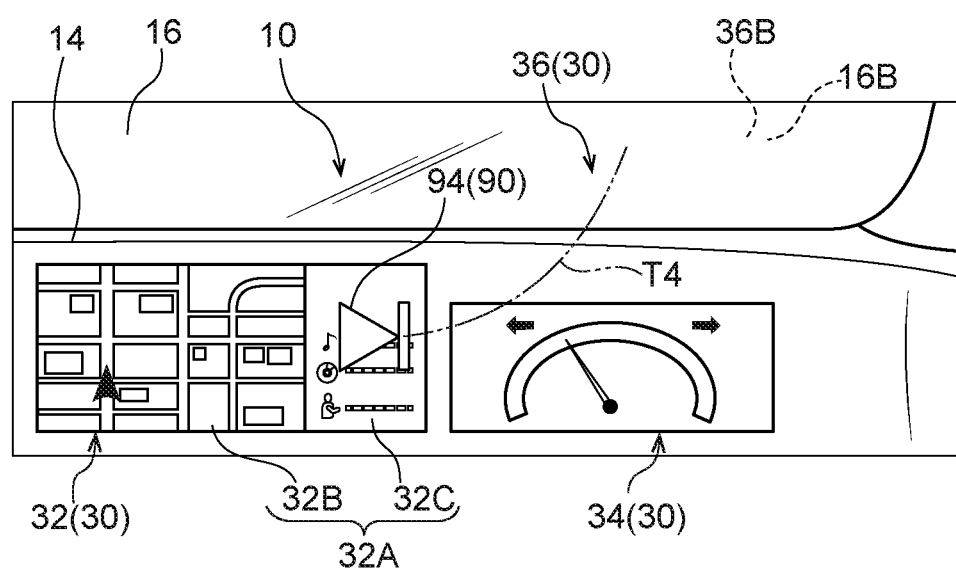
FIG. 9C illustrates an example of feedback notification by display devices of the second exemplary embodiment at the end of an animation.

As illustrated in FIG. 9A to FIG. 9C, in the case of feedback notification, an animation is generated to transition the operation display 90 displayed on the head-up display 36 along a trajectory T4 through the meter display 34 to reach the notification region 32C of the center display 32. The trajectory T4 corresponds to a "line spanning the center display, the meter display, and the head-up display".

The display control device 20 of the present exemplary embodiment exhibits similar advantageous effects to those of the first exemplary embodiment. Namely, causing the display to transition between the center display 32, the meter display 34, and the head-up display 36 enables the driver to be made aware of the display relating to the notification information.

Other Remarks

In the respective exemplary embodiments, explanation has been given regarding cases in which notification information is created for route guidance notification based on route guidance of the car navigation system 50, and for feedback notification on operation of the steering switch 40. However, cases in which notification information is created and an animation is executed are not limited thereto. For example, in cases in which an obstacle has been detected by an advanced driver assistance system (ADAS), an animation may be displayed to move an image of the obstacle as imaged by a camera from the notification region 32C of the center display 32 to the upper projection area 36B. As another example, in cases in which the driver operates an air conditioner or performs a phone call start instruction by speaking into an in-vehicle microphone, an animation may be displayed to move speech recognition content from the upper projection area 36B to the notification region 32C of the center display 32.

Although animations are generated by referencing the management table 220 in the respective exemplary embodiments, the content of the management table 220 may be configured as modifiable by a user. Namely, configuration may be made such that the user is able to modify the notification information animation mode. Such modifiable animation modes include at least animation display start positions, animation display end positions, animation patterns, and animation display durations.

The management table 220 may also be provided by communicating with a server external to the vehicle 12.

In the respective exemplary embodiments, the display devices 30 between which image display transitions by executing animations are not limited to the center display 32, the meter display 34, and the head-up display 36. For example, the display devices 30 may include an electronic exterior mirror display provided to a front pillar 18, illustrated in FIG. 1, or a transparent liquid crystal display disposed on a side window.

Note that the various processing executed by the CPU 20A reading software (a program) in the exemplary embodiments described above may be executed by various types of processor other than a CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The previously described processing may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

Moreover, in the exemplary embodiments described above, explanation has been given in which the program is in a format stored in advance (installed) on a computer-readable non-transitory storage medium. For example, the control program 200 of the display control device 20 is stored in advance in the ROM 20B. However, there is no limitation thereto, and the program may be provided in a format recorded on a non-transitory storage medium such as a compact disc read only memory (CD-ROM), digital versatile disc read only memory (DVD-ROM), or universal serial bus (USB) memory. Alternatively, the program may be provided in a format to be downloaded from an external device over a network.

The processing flow described in the above exemplary embodiments is merely an example thereof, and unnecessary steps may be removed, new steps may be added, and the processing sequence may be changed within a range not departing from the spirit thereof.

What is claimed is:

1. A display control device provided at a vehicle and comprising a processor, a first display section, a second display section adjacent to the first display section, and a third display section adjacent to the second display section in a different direction from the first display section, the processor being configured to:
control the first display section, the second display section, and the third display section;
acquire notification information to be notified to a driver of the vehicle; and
execute an animation such that the notification information currently being displayed on one of the first display section or the third display section is displayed on the second display section and then displayed on another of the first display section or the third display section,
wherein the first display section, the second display section, and the third display section are disposed in this sequence from outside of a field of vision of the driver when driving toward a center of the field of vision, and
the processor is configured such that, when the notification information displayed on the first display section is navigation guidance information generated in response to a predetermined condition, the processor executes an animation to move display of the navigation guidance information from the first display section to the third display section via the second display section.

2. The display control device of claim 1, wherein:
the processor is configured such that, when the notification information currently being displayed on the third display section is information other than the navigation guidance information, the processor executes an animation to move display of the notification information from the third display section to the first display section via the second display section.

3. The display control device of claim 1, wherein:
the first display section is a center display installed at a vehicle width direction center of the vehicle;
the second display section is a lower display section corresponding to a display region toward a vehicle lower side of a head-up display installed at a vehicle upper side of a meter display;
the third display section is an upper display section corresponding to a display region at the vehicle upper side of the lower display section of the head-up display; and
the processor is configured to execute an animation to move the notification information along a line spanning the center display, the lower display section, and the upper display section.

4. The display control device of claim 1, wherein:
the first display section is a center display installed at a vehicle width direction center of the vehicle;
the second display section is a meter display installed facing the driver;
the third display section is a head-up display installed at a vehicle upper side of the meter display; and
the processor is configured to execute an animation to move the notification information along a line spanning the center display, the meter display, and the head-up display.

5. The display control device of claim 1, wherein the processor is configured to change display of the notification information when the notification information transitions between the first display section and the second display section.

6. The display control device of claim 5, wherein display of the notification information on the second display section and the third display section is simplified or abbreviated in comparison to display of the notification information on the first display section.

7. The display control device of claim 1, wherein an animation mode of the notification information is configured so as to be modifiable by a user.

8. The display control device of claim 2, wherein:
the information other than the navigation guidance information is information related to music playback.

9. A display control method for controlling a first display section, a second display section, and a third display section that are provided at a vehicle such that the second display section is provided adjacent to the first display section, and the third display section is provided adjacent to the second display section in a different direction from the first display section, the display control method comprising:
acquisition processing to acquire notification information to be notified to a driver of the vehicle; and
execution processing to execute an animation such that the notification information currently being displayed on one of the first display section or the third display section is displayed on the second display section and then displayed on another of the first display section or the third display section,
wherein the first display section, the second display section, and the third display section are disposed in this sequence from outside of a field of vision of the driver when driving toward a center of the field of vision, and the execution processing includes, when the notification information displayed on the first display section is navigation guidance information generated in response to a predetermined condition, executing an animation to move display of the navigation guidance information from the first display section to the third display section via the second display section.

10. A computer-readable non-transitory storage medium storing a program to control a first display section, a second display section, and a third display section provided at a vehicle such that the second display section is provided adjacent to the first display section, and the third display section is provided adjacent to the second display section in a different direction from the first display section, the program being executable by a computer to perform processing comprising:

acquisition processing to acquire notification information to be notified to a driver of the vehicle; and execution processing to execute an animation such that the notification information currently being displayed on one of the first display section or the third display section is displayed on the second display section and then displayed on another of the first display section or the third display section, wherein the first display section, the second display section, and the third display section are disposed in this sequence from outside of a field of vision of the driver when driving toward a center of the field of vision, and the execution processing includes, when the notification information displayed on the first display section is navigation guidance information generated in response to a predetermined condition, executing an animation to move display of the navigation guidance information from the first display section to the third display section via the second display section.

* * * * *